(12) United States Patent
Soppelsa et al.

(10) Patent No.: US 7,186,047 B2
(45) Date of Patent: Mar. 6, 2007

(54) METHOD AND APPARATUS FOR RELEASABLE FASTENING AND FOR MODIFICATION OF THE RELATIVE POSITIONS OF TWO COMPONENTS WITH RESPECT TO ONE ANOTHER

(75) Inventors: Peter Soppelsa, Rebstein (CH); Waldemar Blüthgen, Braunfels (DE)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 8 days.

(21) Appl. No.: 10/931,859

(22) Filed: Sep. 1, 2004

(65) Prior Publication Data

US 2005/0047857 A1   Mar. 3, 2005

(30) Foreign Application Priority Data

Sep. 1, 2003   (DE) ............................... 103 40 604

(51) Int. Cl.
*F16B 5/02* (2006.01)
(52) U.S. Cl. .................... 403/106; 403/168; 403/409.1
(58) Field of Classification Search ........... 248/222.11, 248/222.13, 222.14, 224.51; 403/61, 63, 403/87, 13, 14, 83, 106–108, 167, 168, 4, 403/408.1; 411/102, 539
See application file for complete search history.

(56) References Cited

U.S. PATENT DOCUMENTS

| 1,911,770 | A |   | 5/1933  | Redfield |
|---|---|---|---|---|
| 4,035,093 | A | * | 7/1977  | Redshaw ........................ 403/4 |
| 4,081,848 | A | * | 3/1978  | Blanding .................. 360/291.6 |
| 4,621,962 | A | * | 11/1986 | Rozniecki .................... 411/368 |
| 5,047,896 | A | * | 9/1991  | Zust ............................ 361/784 |
| 5,141,357 | A | * | 8/1992  | Sherman et al. .......... 403/408.1 |
| 5,310,299 | A | * | 5/1994  | Bernstein ..................... 411/354 |
| 5,352,002 | A | * | 10/1994 | Vouillon et al. ............. 292/155 |
| 5,833,225 | A | * | 11/1998 | Weber ......................... 269/138 |
| 6,394,439 | B1 | * | 5/2002 | Weber ......................... 269/138 |

* cited by examiner

*Primary Examiner*—Daniel P. Stodola
*Assistant Examiner*—Joshua T. Kennedy
(74) *Attorney, Agent, or Firm*—Hodgson Russ LLP (57) ABSTRACT

An apparatus for releasable fastening and for modifying the relative position of two components (1, 1', Bf, G; 2, 2', Bk, Br), which have a common connecting surface forming a contact surface (5, 5'), comprises two screws (3), which in coaction with specially configured V-shaped notch zones ($9a_1$, $9a_2$; $9b_1$, $9b_2$; $9a_3$, $9a_4$; $9b_3$, $9b_4$) permit a relative positioning in zero-backlash and accurately aligned fashion, and serve as the fastening means. It is thereby possible to perform a linear displacement and/or a rotation and/or a tilt in simple fashion.

15 Claims, 6 Drawing Sheets

METHOD AND APPARATUS FOR RELEASABLE FASTENING AND FOR MODIFICATION OF THE RELATIVE POSITIONS OF TWO COMPONENTS WITH RESPECT TO ONE ANOTHER

CROSS REFERENCE TO RELATED APPLICATIONS

This application claims priority of the German patent application 103 40 604.2 filed Sep. 1, 2003 which is incorporated by reference herein.

FIELD OF THE INVENTION

The invention concerns a method and an apparatus for connecting two components to one another using at least one screw, the relative position being precisely adjustable in one direction during fastening.

BACKGROUND OF THE INVENTION

In order to connect two (for example, mechanical or optical) components immovably to one another and additionally to bring about a relative displacement of the one component with respect to the other, it is known, for example, to create a threaded connection by the fact that the component to be aligned comprises at least one elongated hole through which engages a screw that is connected to the stationary part. Another known technical solution consists in providing a transport thread by the actuation of which a linear shift of the movable component is possible. It is additionally known to perform a relative displacement of two components with respect to one another by means of an eccentric.

This aforesaid existing art entails several disadvantages. With the elongated-hole version, the component to be moved cannot be precisely and reproducibly displaced in one direction. In particular, small displacements cannot be performed in controlled fashion. The use of a transport thread is on the one hand complex; on the other hand this technical solution results in only an inadequately guided connection, and physical accessibility in the direction of the displacement is moreover always necessary. The use of an eccentric necessitates additional retention in order to prevent displacement in other degrees of freedom; furthermore, immobilization of the position that has been or is to be set is also necessary.

SUMMARY OF THE INVENTION

It is therefore the object of the present invention to describe a method and an apparatus for releasable fastening and for modification of relative position, the aforesaid disadvantages being reliably eliminated.

With the present invention, relative positions can be set in one direction with high precision, and simultaneously an undesired displacement in other degrees of freedom can be prevented. Simple mechanical means are used in this context. An equal and opposite rotation of two screws (or nuts), which coact with a trapezoidal support having a V-shaped flank, allows sensitive, zero-backlash modification of the position of the component that is to be moved and then fastened.

The present invention also makes possible, in addition to a pure linear translation with subsequent immobilization of the component, centering in the plane, or alignment in three dimensions.

BRIEF DESCRIPTION OF THE DRAWINGS

The invention will be explained in more detail below with reference to the schematic drawings, in which:

FIG. 2b is a side view of what is depicted in FIG. 2a;

DETAILED DESCRIPTION OF THE INVENTION

Figure 1:
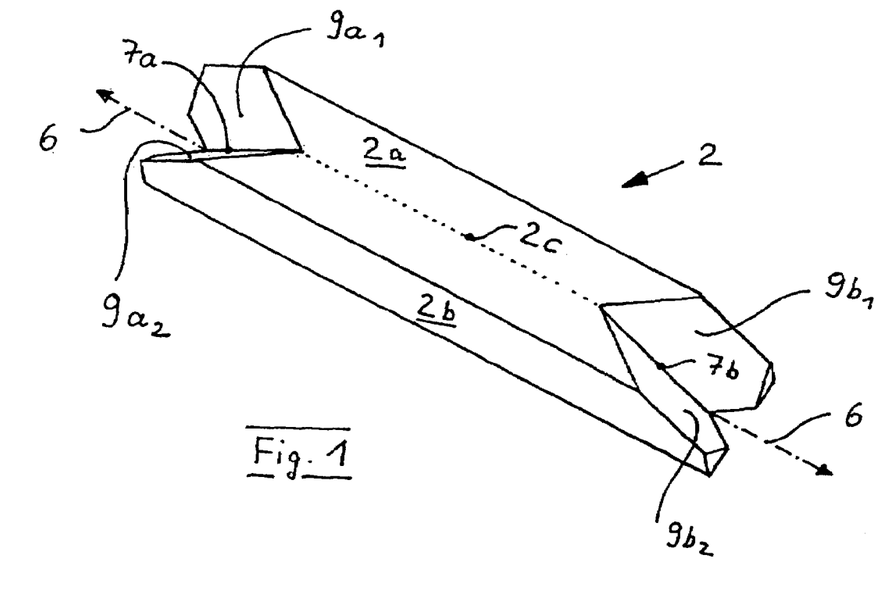
FIG. 1 is a perspective view of the component according to the present invention that is to be moved and fastened.

FIG. 1 shows a mechanical component 2 in perspective. This is a parallelepipedal body whose upper side 2a is visible together with one lateral surface 2b. Located at each of the two end faces are respective V-shaped notch zones $9a_1$, $9a_2$ and $9b_1$, $9b_2$. These are planar, beveled surfaces. Surfaces $9b_1$ and $9b_2$ meet at an edge 7b; the same applies analogously to $9a_1$ and $9a_2$, which meet at edge 7a. Component 2 has a plane of symmetry which is perpendicular to upper side 2a and whose course 2c is also shown. It is evident from this perspective depiction that the section plane through component 2 along the plane of symmetry represents a trapezoid. In the event that trapezoidal flanks 7a, 7b are of identical length, it is an isosceles trapezoid.

Into these V-shaped notch zones $9a_1$, $9a_2$, $9b_1$, $9b_2$ engage two screws 3, as shown in FIGS. 2a through 2d. Screw heads 3a, 3b are embodied in countersink-head fashion. They have rounded contours 3a', 3b'. This ensures that head 3a of screw 3 respectively forms a single-point contact on the one hand with beveled surface $9a_1$, and on the other hand with beveled surface $9a_2$. An analogous situation occurs for screw 3 arranged at the right, with its rounded contour 3b'. The underside of screw head 3b contacts on the one hand beveled surface $9b_1$ and on the other hand beveled surface $9b_2$. This therefore means that each screw is in engagement with V-shaped notch zones $9a_1$, $9a_2$, $9b_1$, $9b_2$, and implements a two-point contact.

Figure 2A:
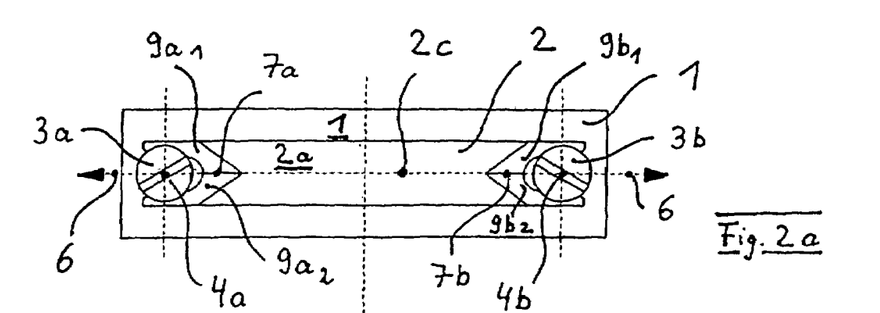
FIG. 2a is a plan view of the two components with the associated shifting and fastening means.
Figure 2B:
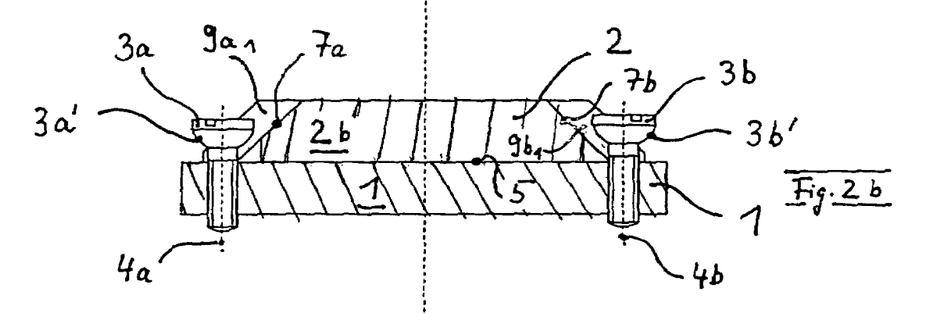

FIG. 2b depicts the situation in which left and right screws 3 are anchored to the same "depth" in the fixed base component 1, so that movable component 2 is in its center position. This is indicated by a dashed vertical line extending through FIGS. 2a and 2b.

Figure 2C:
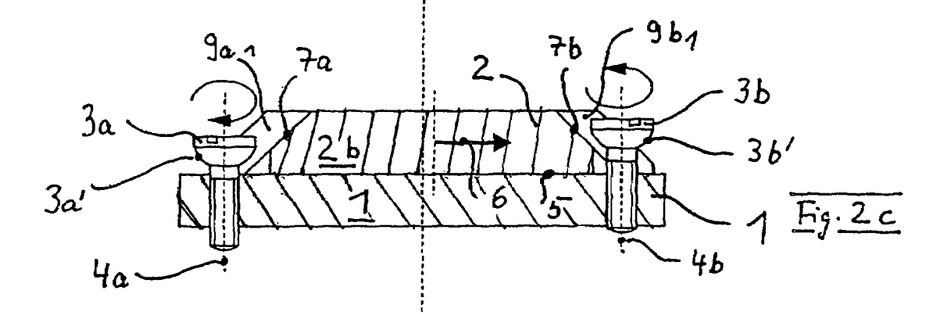
FIG. 2c shows what is depicted in FIG. 2b, but after a rightward displacement.
Figure 2D:
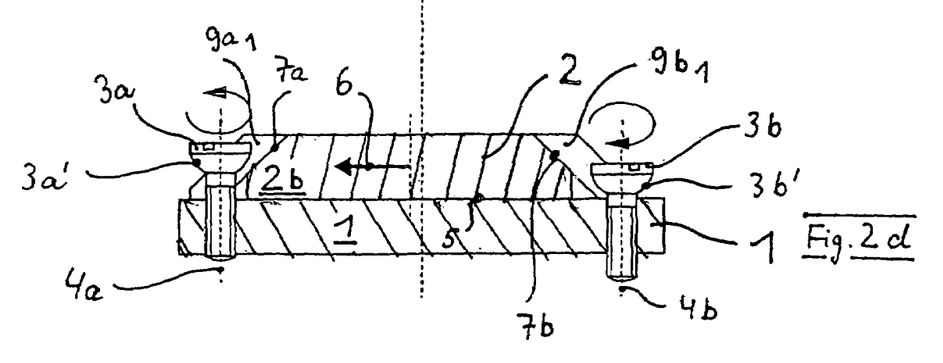
FIG. 2d shows what is depicted in FIG. 2b, but after a leftward displacement.

In FIG. 2c, the left screw is rotated along its axis 4a deeper into component 1 (cf. the clockwise rotation arrow depicted), while the right screw has been rotated along its axis 4b farther out of component 1 (cf. rotation arrow depicted, which illustrates rotation in the opposite direction). The evident result is that by means of this simultaneous and opposite-direction rotary actuation of the two screws 3, component 2 has been displaced in controlled fashion to the right along contact plane 5 in translation direction 6. This displacement can be performed sensitively and with zero backlash when both screws 3 are actuated simultaneously. Once the desired position has been reached, the two screws 3 function as permanent immobilization means for component 2 on its support (base component 1). It is immediately apparent that as necessary, the two screws 3 can be actuated simultaneously (but in the opposite direction) to establish a different position. This is apparent from FIG. 2d. Component 2 has been displaced linearly along translation direction 6, in which context left screw 3 had to be rotated out of fixed base component 1, and simultaneously right screw 3 had to be rotated (clockwise) into base component 1.

Figure 3A:
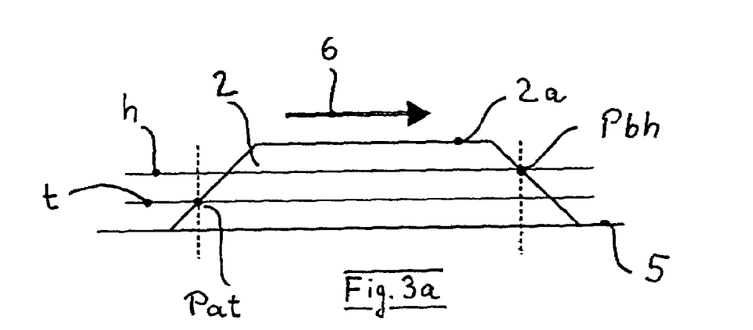
FIG. 3a is a section through the component depicted in FIG. 1 along its plane of symmetry, to explain the position depicted in FIG. 2c.
Figure 3B:
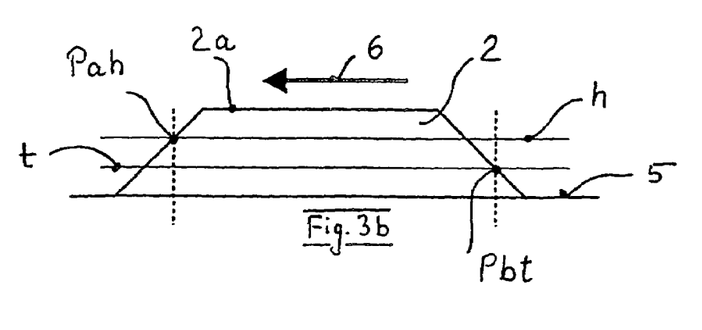
FIG. 3b shows what is depicted in FIG. 3a, but to explain the position depicted in FIG. 2d.

FIGS. 3a and 3b illustrate the inventive principle of simultaneous opposite-direction actuation of screws 3 to achieve a desired displacement travel of component 2 (linear translation direction 6). The Figures depict an isosceles trapezoid that is obtained when a vertical section plane is placed through component 2, parallel to its plane of symmetry, in such a way that point contact is made the one hand between contour 3b' of screw head 3b and beveled surface $9b_1$, and on the other hand between contour 3a' of screw head 3a and beveled surface $9a_1$. Single-point contact Pbh is visible on the right side, and single-point contact Pat likewise on the left side. These contact points are located at different vertical levels h, t on the isosceles trapezoid. Comparing the schematic diagram of FIG. 3a with the schematic depiction of FIG. 2c, it is apparent that in this configuration that is shown, a controlled translation to the right (translation direction 6) has been performed. This means that screw head 3a' has, as it were, "slipped" downward along beveled surface $9a_1$, while right screw head 3b has simultaneously been "pushed" upward, i.e. to a higher level. If the rotation direction of the two screws 3 is modified, the result is then the leftward displacement of component 2 depicted in FIG. 3b and FIG. 2d.

It is within the scope of the present invention to modify the slope of the beveled surfaces from one component to another. Different translation amounts are thus obtained as a function of the thickness of component 2. It is also possible to equip beveled surfaces $9a_1$, $9a_2$, provided on the left side of component 2, with a slope different from that of beveled surfaces $9b_1$, $9b_2$ arranged on the right side of component 2. It is additionally possible to vary the V-shaped notch zones $9a_1$, $9a_2$; $9b_1$, $9b_2$; $9a_3$, $9a_4$, $9b_3$, $9b_4$ in terms of their V angle. This also yields optimum adaptation capabilities in each individual case in order to achieve a desired translation travel.

Figure 5:
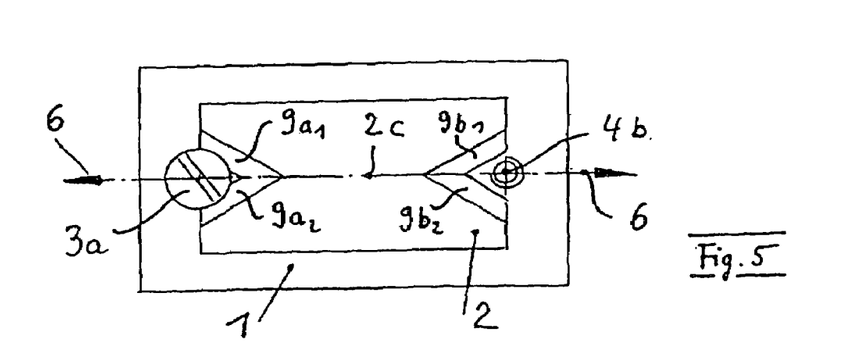
FIG. 5 shows a slight modification of what is depicted in FIG. 2a (without elongated holes)
Figure 6:
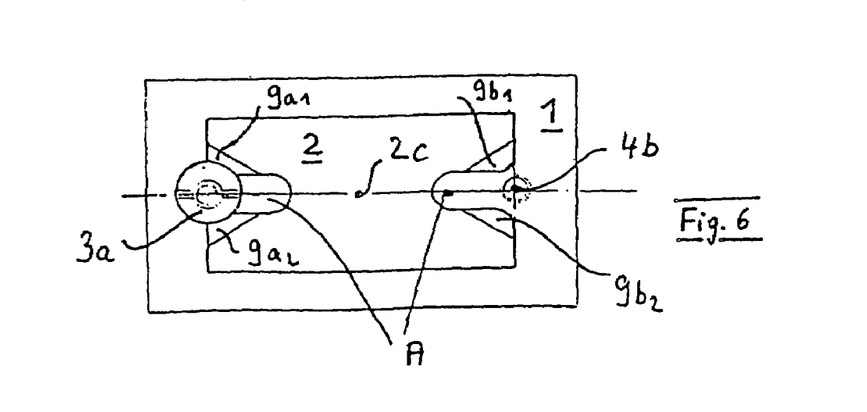
FIG. 6 shows a further slight modification of what is depicted in FIG. 5 (with cutouts similar to elongated holes)

As is already indirectly evident from FIG. 2a, a respective elongated hole is already present in both notch zones, whereas the depiction in FIG. 5 comprises exclusively V-shaped notch zones. The function of an elongated hole in each of notch zones $9a_1$, $9a_2$, $9b_1$, $9b_2$ is illustrated in FIG. 6. The axes of elongated holes A lie along the course of plane of symmetry 2c. The presence of these elongated holes A results in an extended translation travel for a displacement of component 2 that is to be performed.

Figure 7:
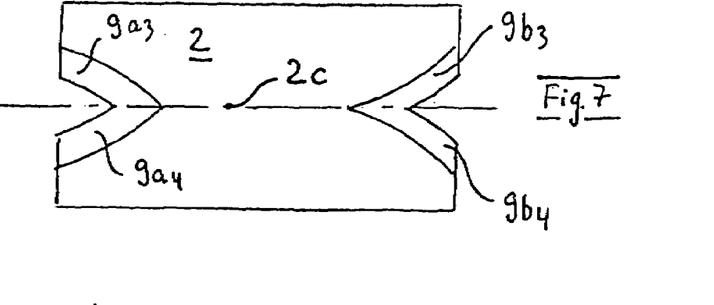
FIG. 7 shows two further modified forms of the V-shaped notch zones.

FIG. 7 depicts further geometric variants of the notch zones. While planar notch zones were depicted in FIG. 5, as already described above, the left side of FIG. 7 shows non-planar notch zones $9a_3$, $9a_4$ similar to a tapering V opening, while a non-planar notch zone $9b_3$, $9b_4$ similar to an expanding V opening is located on the right side of FIG. 7. These geometric embodiments can be varied and combined as desired.

The same applies to the three-dimensional shape of the undersides of screw heads 3a, 3b. These shapes can be semi-spherical or ellipsoidal or paraboloidal. The only fundamental condition is that the respective contours of screw heads 3a, 3b form single-point contacts with the respective beveled surfaces. This therefore means that in the context of the present invention it is also possible to embody the undersides of the screw heads in frustoconical fashion if the beveled surfaces are non-planar, so that a non-linear line of all single-point contacts is obtained as screws 3 are rotated. This therefore means that, in contrast to what is depicted in FIG. 3, the two isosceles flanks of the trapezoid are not embodied linearly, but rather extend in concave or convex fashion. The term "countersink head" shall include, without limitation, a head having a tapered shape. Frustoconical heads and curved contour heads are examples of countersink heads.

Figure 8:
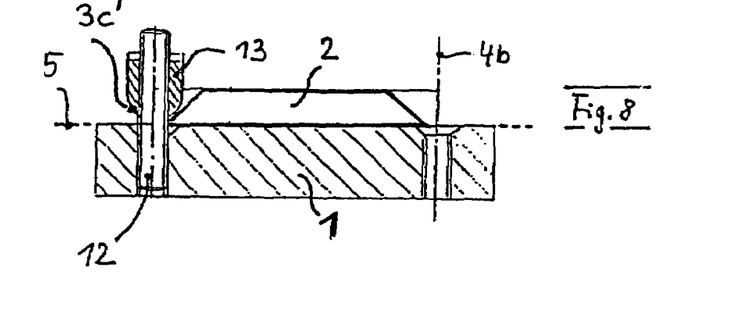
FIG. 8 shows a further modification of what is depicted in FIGS. 2b through 2d (threaded studs with nuts)

FIG. 8 shows that instead of using screws 3, the device can also be made in such a way that a threaded stud 12, which has a nut 13 that has rounded contours 3c', is anchored in fixed base component 1 or in a baseplate G. The functionality of achieving a single-point contact is ensured by this geometric conformation as well. It is of course possible to use, in the apparatus according to the present invention, only one screw 3 and one threaded stud 12 with nut 13. The rounded contour of the nut can also be replaced by a frustoconical shape for use with non-planar beveled surfaces.

Figure 4:
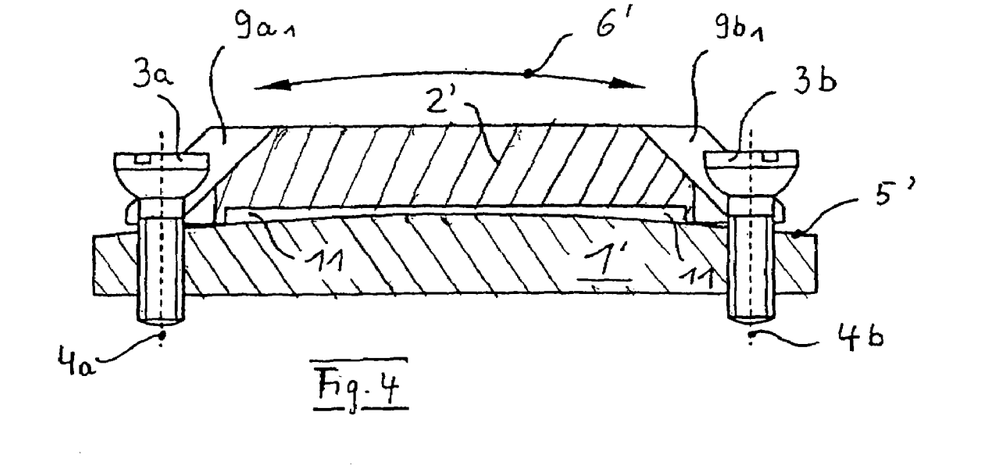
FIG. 4 shows a second inventive embodiment having a non-planar contact surface for spherical translation.

FIG. 4 depicts a further embodiment. The differences with respect to FIG. 2b are as follows: fixed base component 1' has a non-planar contact surface 5', while FIG. 2b refers to a fixed base component 1 having a planar contact surface 5. Component 2' that is to be displaced has, on its underside facing toward component 1', a recess 11 in order to ensure unhindered displacement on the convex surface of base component 1' along translation direction 6'. The elevated surface of base component 1' is preferably a spherical surface, although other non-planar surface conditions are also conceivable. Instead of an elevated surface (convex surface), a recessed surface (concave surface) can also be present.

FIGS. 10 through 14 depict further variants of the present invention in which the movable component is either a rotationally retained disk-shaped embodiment (FIGS. 10 and 11) or a tiltably or pivotably retained embodiment.

Figure 10:
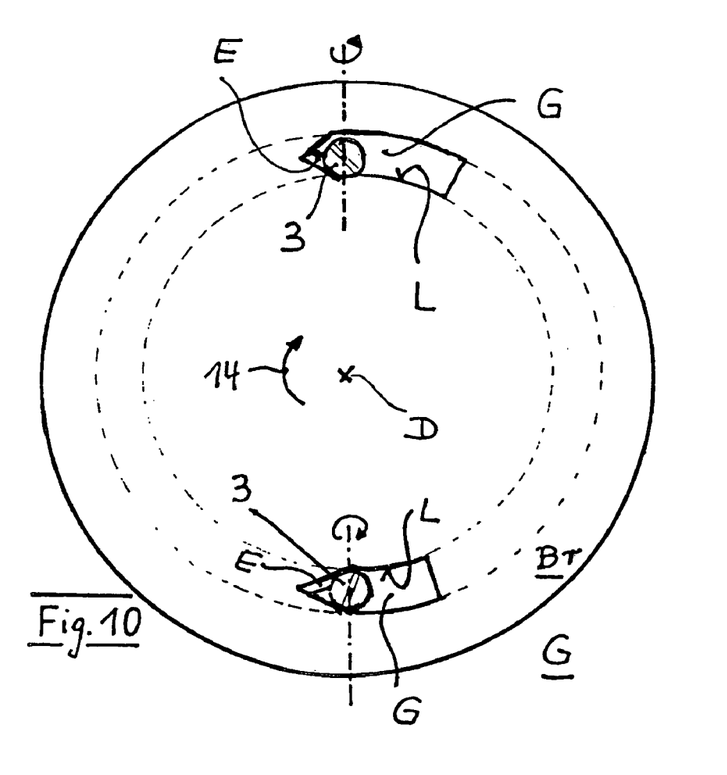
FIG. 10 shows a further embodiment with a disk-shaped component on a baseplate.
Figure 11:
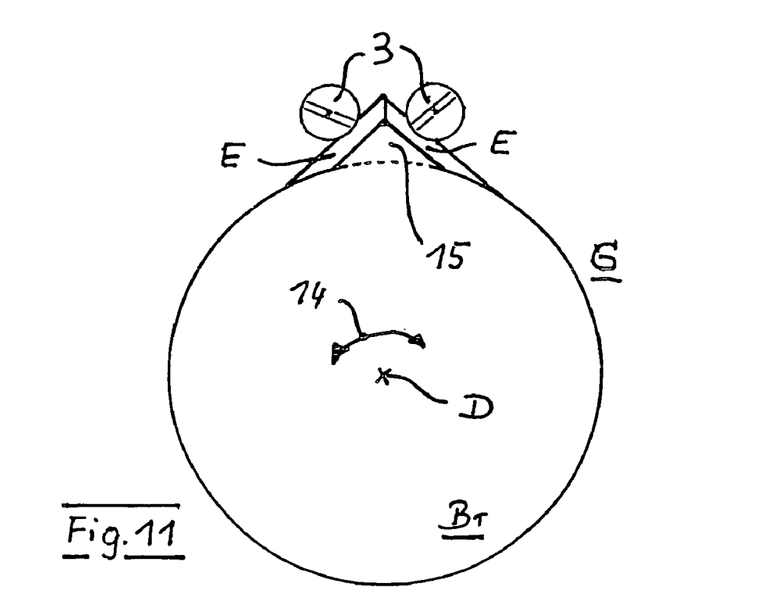
FIG. 11 shows a further embodiment with a disk-shaped component having an attached "nose"

A disk-shaped component Br is connected via a rotation shaft D to a fixed base component, here called a baseplate G. Disk Br has in its peripheral region two spherical elongated holes L that are at identical distances from the center point of the disk, i.e. from the point at which rotation shaft D penetrates through disk Br. Each of elongated holes L has on its one side a V-shaped contour, only one V side in each case possessing a beveled surface E.

FIG. 10 depicts the fact that a screw 3 passes through each elongated hole and is thread-retained in baseplate G (not depicted). The relative positioning of movable component Br is then accomplished by simultaneous rotation of both screws 3 in opposite directions. If, as illustrated by the two rotation arrows, lower screw 3 is rotated clockwise and upper screw 3 is simultaneously rotated in the opposite direction, disk Br then rotates a specific amount about its center point D along circular arrow 14.

In this embodiment as well, the variants mentioned above—in terms of the angle or side length of the V, or the surface shape of individual beveled surface E or the slope of individual beveled surface E—can be provided for. It is also self-evident that a fixed base component 1 or a component 1' can be used instead of baseplate G.

FIG. 11 once again shows a disk-shaped component Br. The latter, however, contains at one end of its disk a "nose" 15 that extends in triangular fashion away from disk center point D. The two sides of this nose 15 are in turn embodied as individual beveled surfaces E and are respectively in point contact with screws 3. In this variant as well, a change in position constituting a certain amount of rotation is possible upon simultaneous but opposite-direction rotation of screws 3. In FIG. 11 the disk is once again retained on a baseplate; it is of course also possible for it to be another fixed component 1 or 1'.

Figure 12:
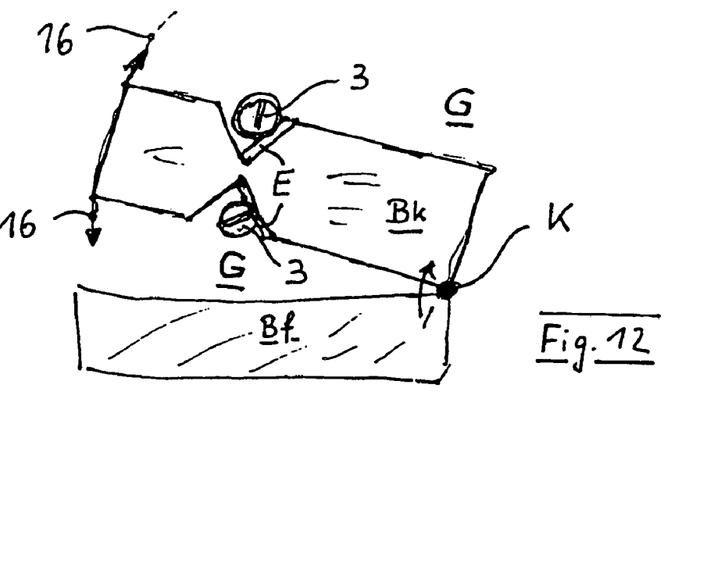
FIG. 12 shows a further embodiment with a tilting function according to the present invention.
Figure 13:
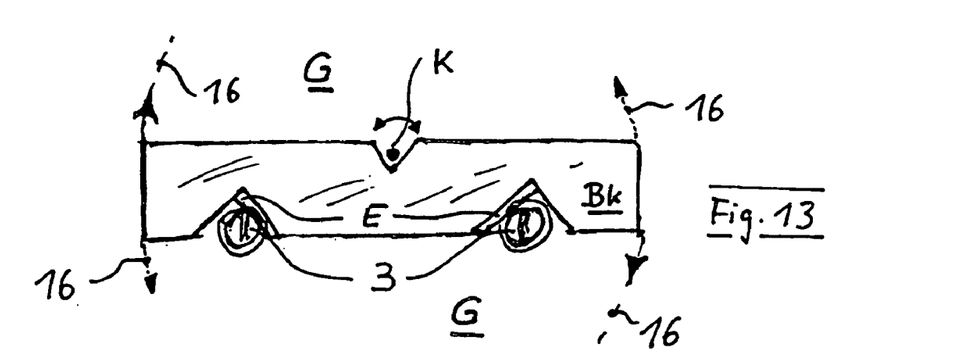
FIG. 13 shows a further embodiment with a tilting function about a central tilt shaft.
Figure 14:
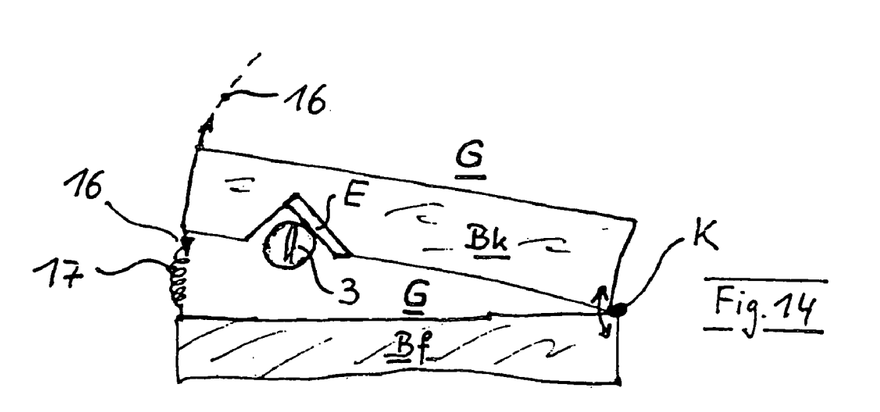
FIG. 14 shows a further embodiment having only one screw and a spring.

FIGS. 12 through 14 depict tilting mechanisms, in which context component Bk that is to be moved can be tilted in controlled fashion along translation directions 16 about a tilt shaft K. Component Bk is pivot-mounted on tilt shaft K, which in turn is mounted on baseplate G (not depicted). Additionally depicted is a fixed component Bf that can likewise be mounted on baseplate G. Component Bk that is to be tilted has two V-shaped notches, each notch having only one beveled surface. Differential displacement (i.e. tilting, in this case) is accomplished analogously by simultaneous but opposite-direction actuation of the two screws 3.

A further tilting variant is shown in FIG. 13. A tilt shaft K is mounted on a baseplate G (not depicted). Component Bk that is to be tilted has on its one side a notch for positively fitting contact with shaft K; located on the other side of component Bk are two V-shaped notch zones that once again each contain only one beveled surface. Corresponding screws 3 are in contact with them. A tilting motion along tilt directions 16 can be accomplished as a result of the arrangement of the notch zones.

Lastly, FIG. 14 depicts a further variant in which, as a modification of what is depicted in FIG. 12, movable component Bk has a single notch zone having a single beveled surface E. To make possible a reproducible motion with zero backlash in both directions 16 upon actuation of the single screw 3, this component Bk is connected to fixed component Bf via a preloading means, in this case a spring 17.

The variants depicted, which individually make possible either a linear translation or a nonlinear translation or a rotation or a tilt, can be combined in any desired fashion so that translations in the plane (centering operation) or in three dimensions (alignment operation) can be achieved.

Figure 9:
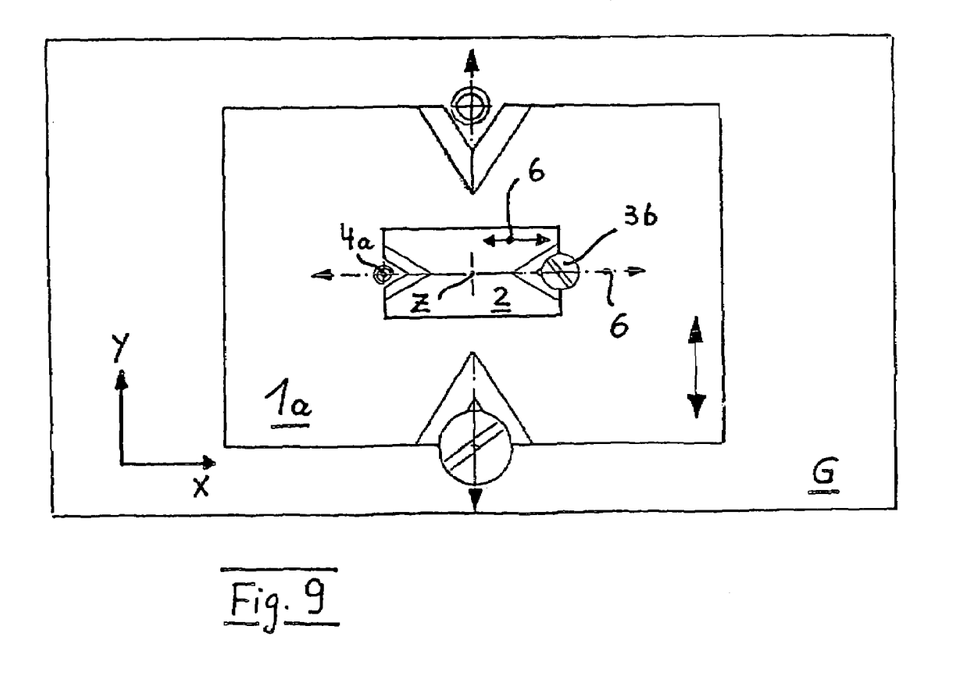
FIG. 9 shows a combination of two variant embodiments according to FIG. 5, their respective translation directions being at right angles to one another.

One example is depicted in FIG. 9, the principle of which involves a combination of two apparatuses one of which was depicted in isolation in FIG. 5. Depicted on a baseplate G is an intermediate component 1a having a planar contact surface 5 corresponding in principle to component 2 of FIG. 5. Two V-shaped recesses having screws associated with them are evident, the screw head being depicted in the lower part and the screw shaft in the upper part. To minimize unnecessary complexity in this drawing, the labeling of these already-known components with reference characters was omitted. What is still important is that this intermediate component 1a can be displaced along the vertical double arrow in the manner already explained. Located on this intermediate component 1a is, in turn, a further movable component 2 that can be displaced in horizontal direction 6. It is thereby possible to displace component 2 in controlled fashion with respect to baseplate G in the X and/or Y direction.

All other possible combinations become evident from this exemplifying depiction. For example, instead of intermediate component 1a that has a planar contact surface 5, it is also possible to receive a component 2' that corresponds to a baseplate of elevated configuration in the manner of FIG. 4. A component 2 having a planar contact zone and a translation direction rotated 90 degrees can in turn be mounted on this component 2'. It is also possible to modify what is depicted in FIG. 9 so that intermediate component 1a is provided on baseplate G, and so that one of the rotational or tilting variants according to FIGS. 10 through 14 is implemented on intermediate component 1a. A triple combination (linear displacement+non-linear displacement in a different direction+rotation or tilt) can also be implemented analogously.

It is within the scope of the present invention for displaceable component 2, 2' to have different functions. It may be, for example, a purely mechanical functional element, for example a stop or an abutment that must be positioned in accurately aligned fashion. On the other hand, it is also possible for this component 2, 2' to carry an optical element on its upper side 2a so that it functions, in a way, as a mount element. It is thus conceivable for it to be, for example, a prism frame, a graduated device, a mirror, a grating, a light fiber exit end, a diaphragm, a slit, or a lens.

PARTS LIST

| | |
|---|---|
| 1 | Fixed base component with planar contact surface (5) |
| 1a | Intermediate component with planar contact surface (5) |
| 1' | Fixed base component with non-planar contact surface (5') |
| 2 | Second component in contact with (3a) and (3b) and displaceable in planar surface |
| 2' | Second component in contact with (3a) and (3b) and displaceable in non-planar surface (5') |
| 2a | Upper side of (2) |
| 2b | Visible lateral surface of (2) |
| 2c | Course of plane of symmetry of (2) extending perpendicular to (2a) |
| 3 | Screw(s) |
| 3a, 3b | Screw head(s) |
| 3a', 3b', 3c' | Rounded contour(s) of (3a), (3b), (3c) |
| 4a, 4b | Screw axis/axes |
| 5 | Course of planar connecting surface (contact surface) |
| 5' | Course of non-planar connecting surface (contact surface) |
| 6 | Linear translation direction(s) |
| 6' | Nonlinear translation direction(s) |
| 7a, 7b | Trapezoidal flank(s) (in section) |
| $9a_1, 9a_2$; $9b_1, 9b_2$ | V-shaped obliquely extending notch zone(s), formed from beveled surfaces |
| $9a_3, 9a_4$; $9b_3, 9b_4$ | V-like obliquely extending non-planar notch zone(s), formed from beveled surfaces |
| 10a, 10b | Elongated hole(s) in V-shaped notch zone(s) |
| 11 | Recess in underside of (2') |
| 12 | Threaded studs secured in (1) |
| 13 | Nut for (12) |
| 14 | Rotation direction(s) of (Br) |

-continued

| 15 | Symmetrical "nose" on (Br) |
| 16 | Tilt direction(s) of (Bk) |
| 17 | Spring |
| A | Cutout(s) similar to elongated holes |
| h | Course of plane, parallel to (5), in which (Pah) and (Pbh) are located (upper two-point contacts) |
| t | Course of plane, parallel to (5), in which (Pat) and (Pbt) are located (lower two-point contacts) |
| Bf | Fixed component on (G) |
| Bk | Component tiltable about (K) |
| Br | Component adjustable rotationally about (D) |
| D | Rotation shaft on (G) |
| E | Individual beveled surface |
| G | Baseplate |
| K | Tilt shaft on (G) |
| L | Spherical elongated hole |
| Pah, Pat | Point contacts of (3a') on ($9a_1$) and ($9a_2$) (left two-point contact of (3) on (2)) |
| Pbt, Pbh | Point contacts of (3b') on ($9b_1$) and ($9b_2$) (right two-point contact of (3) on (2)) |
| Pah, Pbh | Upper point contact(s) of (3a') and (3b') |
| Pat, Pbt | Lower point contact(s) of (3a') and (3b') |
| Z | Center |

What is claimed is:

1. An apparatus comprising:
a movable component including a first notch zone having a pair of beveled surfaces, and a second notch zone having a pair of beveled surfaces, wherein the first and second notch zones are spaced apart, and each pair of beveled surfaces extends at an acute angle relative to the longitudinal axis of each respective notch zone;
a base component including a connecting surface engaged by the movable component;
a first point-contact member threadably adjustable relative to the base component and having a tapered portion arranged in single point contact with each of the pair of beveled surfaces of the first notch zone to form a first two-point contact; and
a second point-contact member threadably adjustable relative to the base component and having a tapered portion arranged in single point contact with each of the pair of beveled surfaces of the second notch zone to form a second two-point contact;
wherein the movable component is displaced along the connecting surface as a result of being engaged by at least one of the first and second point-contact members as the at least one point-contact member is adjusted relative to the base component.

2. The apparatus as defined in claim 1, wherein the movable component is displaceable on the connecting surface of the base component along a translation path corresponding to the shortest connecting path between rotational axes of the first and second point-contact members.

3. The apparatus as defined in claim 2, wherein the movable component has, in a sectional plane perpendicular to the contacting surfaces and containing the translation path, the shape of a trapezoid.

4. The apparatus as defined in claim 3, wherein the trapezoid is an isosceles trapezoid.

5. The apparatus as defined in claim 3, wherein a common intersection line between the pair of beveled surfaces of the first notch zone and a common intersection line between the pair of beveled surfaces of the second notch zone form converging sides of the trapezoid.

6. The apparatus as defined in claim 1, wherein the first and second notch zones are V-shaped notch zones each forming, in plan view, an angle in the range of 90 +/−20 degrees.

7. The apparatus as defined in claim 1, wherein the connecting surface of the base component is non-planar.

8. The apparatus as defined in claim 1, wherein at least one of the first and second point-contact members comprises a screw mating with a threaded hole in the base component, and the screw includes a countersink head defining the tapered portion.

9. The apparatus as defined in claim 1, wherein at least one of the first and second point-contact members comprises a nut mating with a threaded stud fixed to the base component, and the nut includes a rounded or frustoconical contour defining the tapered portion.

10. The apparatus as defined in claim 1, wherein the first and second notch zones are V-shaped notch zones having planar beveled surfaces.

11. The apparatus as defined in claim 1, wherein the first and second notch zones include converging non-planar beveled surfaces.

12. The apparatus as defined in claim 11, wherein the tapered portion of the first point-contact member and the tapered portion of the second point-contact member are frustoconically shaped to make single point contact with the non-planar beveled surfaces of the first and second notch zones.

13. The apparatus as defined in claim 1, wherein the movable component has a plane of symmetry, and each of the first and second notch zones includes an elongated cutout having a longitudinal axis lying in the plane of symmetry and coinciding with the translation path.

14. An apparatus comprising:
a baseplate;
a movable component including a first notch zone having a pair of beveled surfaces, and a second notch zone having a pair of beveled surfaces, wherein the first and second notch zones are spaced apart;
an intermediate component between the baseplate and the movable component, the intermediate component engaging the baseplate and including a connecting surface engaged by the movable component, a third notch zone having a pair of beveled surfaces, and a fourth notch zone having a pair of beveled surfaces, wherein the third and fourth notch zones are spaced apart;
a first point-contact member threadably adjustable relative to the baseplate and having a tapered portion arranged in single point contact with each of the pair of beveled surfaces of the first notch zone to form a first two-point contact;
a second point-contact member threadably adjustable relative to the base component and having a tapered portion arranged in single point contact with each of the pair of beveled surfaces of the second notch zone to form a second two-point contact;
a third point-contact member threadably adjustable relative to the base component and having a tapered portion arranged in single point contact with each of the pair of beveled surfaces of the third notch zone to form a third two-point contact; and
a fourth point-contact member threadably adjustable relative to the base component and having a tapered portion arranged in single point contact with each of the pair of beveled surfaces of the fourth notch zone to form a fourth two-point contact;

whereby the first and second point-contact members are adjustable in a coordinated manner such that the movable component is guided relative to the intermediate component in a first translation direction, and the third and fourth point-contact members are adjustable in a coordinated manner such that the intermediate component and the movable component are guided relative to the baseplate in a second translation direction not coincident with the first translation direction.

15. The apparatus as defined in claim 14, wherein the first translation direction and the second translation direction form an angle of 90 degrees.

* * * * *